United States Patent [19]
Yamamoto et al.

[11] Patent Number: 5,107,279
[45] Date of Patent: Apr. 21, 1992

[54] DIGITAL IMAGE FORMING EQUIPMENT

[75] Inventors: Haruo Yamamoto; Yoshiyuki Fujiwara, both of Osaka, Japan

[73] Assignee: Mita Industrial Co., Ltd., Osaka, Japan

[21] Appl. No.: 728,036

[22] Filed: Jul. 5, 1991

Related U.S. Application Data

[63] Continuation of Ser. No. 438,347, Nov. 16, 1989, abandoned.

[30] Foreign Application Priority Data

Nov. 22, 1988 [JP] Japan .................. 63-295522
Nov. 22, 1988 [JP] Japan .................. 63-295523

[51] Int. Cl.[5] .................................. H04N 1/21
[52] U.S. Cl. .......................... 346/108; 355/202
[58] Field of Search .............. 346/108, 107 R, 1.1, 346/76 L, 160; 358/296, 300, 302; 355/202

[56] References Cited

U.S. PATENT DOCUMENTS 4,647,946  3/1987  Inuyama .................. 346/108
4,933,772  6/1990  Ikenoue .................. 358/300

Primary Examiner—Mark J. Reinhart
Attorney, Agent, or Firm—Koda and Androlia

[57] ABSTRACT

A digital image forming equipment in which image is formed by reflecting and scanning laser light emitted from a source of light onto a photo-sensitive body by means of a polygon mirror driven and rotated by a drive motor, so composed that the rotation of the polygon motor can be started when operating the operating portions installed thereon and can be stopped in the elapse of a specified period of time after the image forming operation is terminated, and a digital image forming equipment so composed that the drive motor can be started by detecting existence of an operator when the operator approaches the image forming equipment and can be stopped in the elapse of a specified period of time after the image forming operation is terminated.

2 Claims, 5 Drawing Sheets

DIGITAL IMAGE FORMING EQUIPMENT

This is a continuation of application Ser. No. 438,347, filed Nov. 16, 1989 now abandoned.

BACKGROUND OF THE INVENTION

1. Field of the Invention

The present invention relates to a digital image forming equipment in which image is formed by reflecting and scanning laser light emitted from a source of light onto a photosensitive body by means of a polygon mirror driven by a drive motor (so-called a polygon motor).

2. Description of the Prior Art

In a digital copying machine which is one of the examples of this kind of a digital image forming equipment, laser light is irradiated on the surface of a photosensitive drum on the basis of information of copy images which have been digitally signalized, thereby causing electrostatic latent images to be formed. At this time, the above laser light which is emitted from the source of light is reflected and scanned onto the surface of a photosensitive drum by means of a polygon mirror rotated by a polygon motor.

The above polygon motor usually rotates at such a high speed as 5,000 to 20,000 r.p.m. and is requested to rotate at a stabilized condition since high precision is required for scanning the laser light. As it usually takes about 5 seconds from start of the rotation of the above polygon motor to reaching the stabilized rotation condition, conventionally the polygon motor starts to rotate as soon as the power source of a copying machine is turned on, and it is so controlled that it can usually consecutively rotate while waiting unless the power source is turned off. Quick response for copying jobs by an operator have been thus secured.

As described in the above, as the polygon motor consecutively rotates at a high speed for a longer period of time, for instance, a very high grade of bearing such as a non-contact bearing of air gap type is required. There are some problems that a non-contact type bearing as shown in the above becomes so complicated in structure and the price thereof may become comparatively high.

Furthermore, as the above polygon motor rotates at a high speed, rotary noise whose frequency is comparatively high is emitted in accompanying with the rotation of the polygon motor. In addition, the above rotary noise is continuously emitted for a longer period of time since the above polygon motor consecutively rotates, thereby causing another problem to occur. That is, the polygon motor gives a sense of uncomfortable feeling to every person who is in the vicinity of the copying machine.

SUMMARY OF THE INVENTION

It is an object of the present invention to provide a digital image forming equipment in which a polygon motor is not caused to rotate at all times and does not emit such rotary noises as to give a sense of uncomfortable feeling to persons, taking quick response to copying jobs of an operator into consideration, and whose cost of production can be decreased by adopting bearings of comparatively cheap contact type in spite of that the service life thereof is comparatively short.

In order to accomplish the above object, the first inventive point is that a digital image forming equipment in which image is formed by reflecting and scanning laser light emitted from a source of light onto a photo-sensitive body by means of a polygon mirror driven and rotated by a drive motor comprises;
  means for starting the rotation of a drive motor when operating the operating portions provided in the body of the above image forming equipment, and
  means for stopping the rotation of the drive motor in a specified period of time after the termination of image forming operation.

And the second inventive point is that a digital image forming equipment in which image is formed by reflecting and scanning laser light emitted from a source of light onto a photo-sensitive body by means of a polygon mirror driven and rotated by a drive motor comprises;
  means for detecting the existence of an operator who approaches the above image forming equipment,
  means for starting the rotation of the above drive motor according to the state of output signals from the above detecting means, and
  means for stopping the rotation of the drive motor in a specified period of time after the termination of image forming operation.

This specification of the present invention specifically points out the subject thereof and is complete with the claims clearly claimed. The above, and other objects, features and advantages of the present invention, will become apparent from the following description taken in conjunction with the accompanying drawings.

DETAILED DESCRIPTION OF THE PREFERRED EMBODIMENTS

Figure 1:
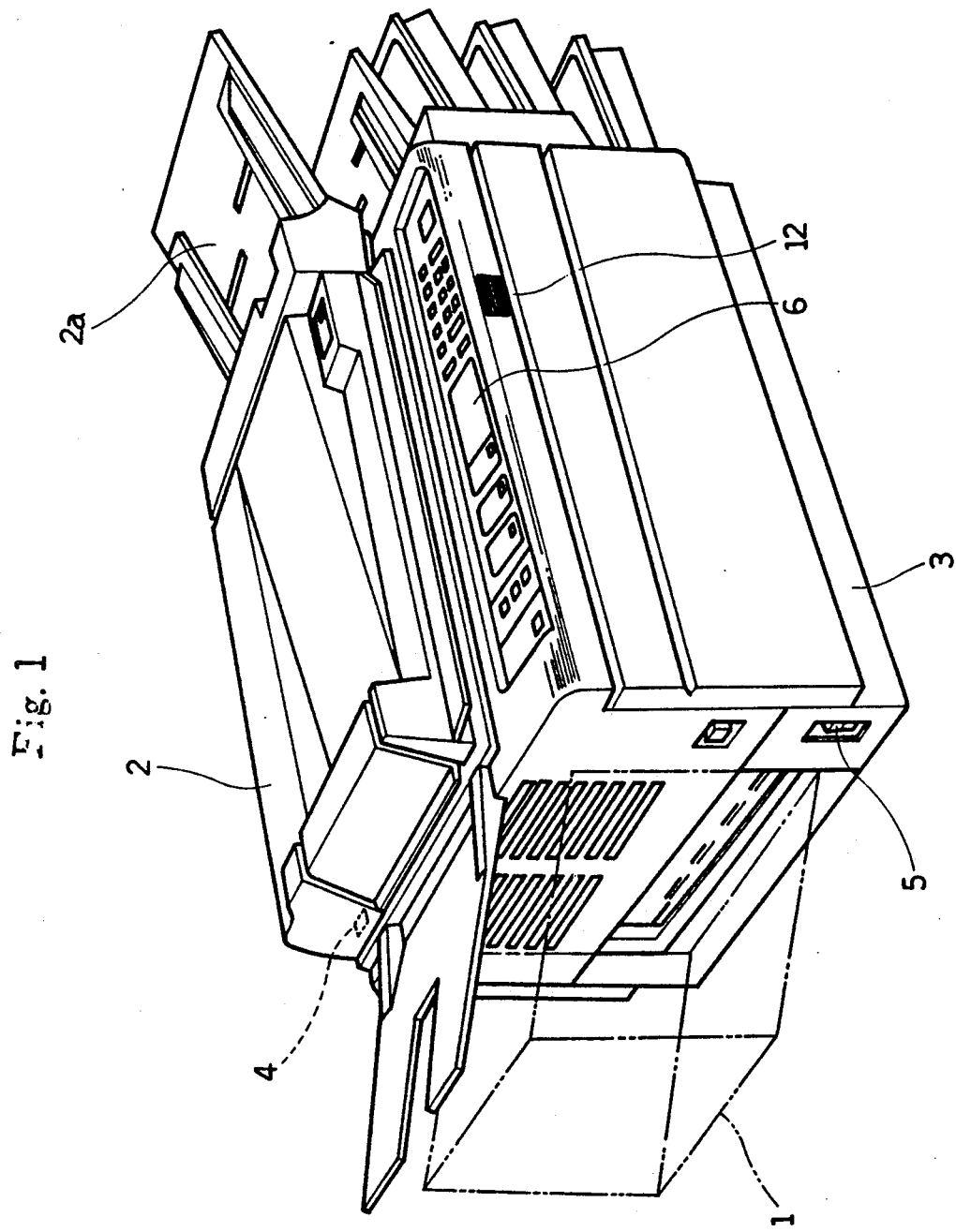
FIG. 1 is an appearance view of a digital copying machine of a preferred embodiment of the present invention.

As shown in FIG. 1, a digital copying machine of this preferred embodiment has almost the same appearance as that of the conventional digital copying machine.

Namely, a detection switch (not illustrated herein) for detecting whether or not a document exists is placed on a document set portion 2a of a automatic document feeding unit 2 which has a sorter 1. The above automatic document feeding unit 2 is so placed that it can be opened and closed against the copying machine proper 3, and a document pusher mat (not illustrated) is mounted at the lower side of this automatic document feeding unit 2.

An opening and closing detection switch 4 is so arranged at the position which confronts to the lower surface of the above automatic document feeding unit 2 on the above copying machine proper 3 that it can detect opening or closing of the above document pusher mat. A state that a document is placed on the upper surface of the ducument set plate is indirectly detected by ON or OFF of the above opening and closing detection switch 4.

A power switch 5, and an operation panel 6 are shown in FIG. 1. Various kinds of operating switches such as a number-of-copies setting switch, a selector switch for paper size, a sorter actuation switch and a start switch are arranged on the operation panel 6.

The operating portion consists of the above opening and closing detection switch 4, a detection switch for a document on the document set portion 2a and various kinds of switches on the operation panel 6.

Figure 2:
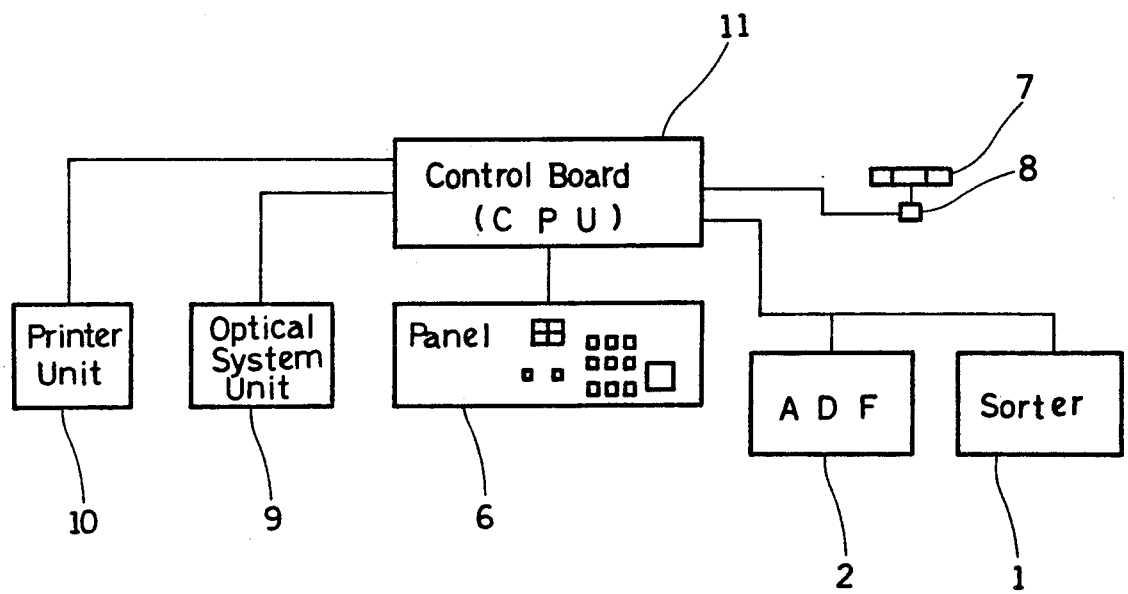
FIG. 2 is a block diagrammatic view of a control system of the above digital copying machine.

In the upper section of the above copying machine proper 3 are arranged a polygon mirror 7 (Refer to FIG. 2) for reflecting laser light emitted from the source of light and scanning the same on the photosensitive drum, a polygon motor 8 (a drive motor) to drive and rotate this polygon mirror 7 at a high speed and an optical system unit 9 to read the image of a document placed on the document set plate.

In addition, a printer unit 10 which comprises a development section to develop electrostatic latent image formed on the above photosensitive drum, a transfer section to transfer the above copy image to a copying sheet of paper and a fixing section of the above image on the copying sheet of paper are arranged in the lower part of the above copying machine 3.

The above sorter 1, automatic document feeding unit 2, polygon motor 8, optical system unit 9 and printer unit 10 are controlled by a control board 11 in accordance with the signals coming from various kinds of operating switches located in the above operation panel 6, the opening and closing detection switch 4 and the document detection switch.

The above control board 11 comprises a CPU, memory means and interfaces.

And a program is pre-memorized in the above memory means in order to drive and control the sorter 1, the automatic document feeding unit 2, the polygon motor 8, the optical unit 9 and the printer unit 10.

Figure 3:
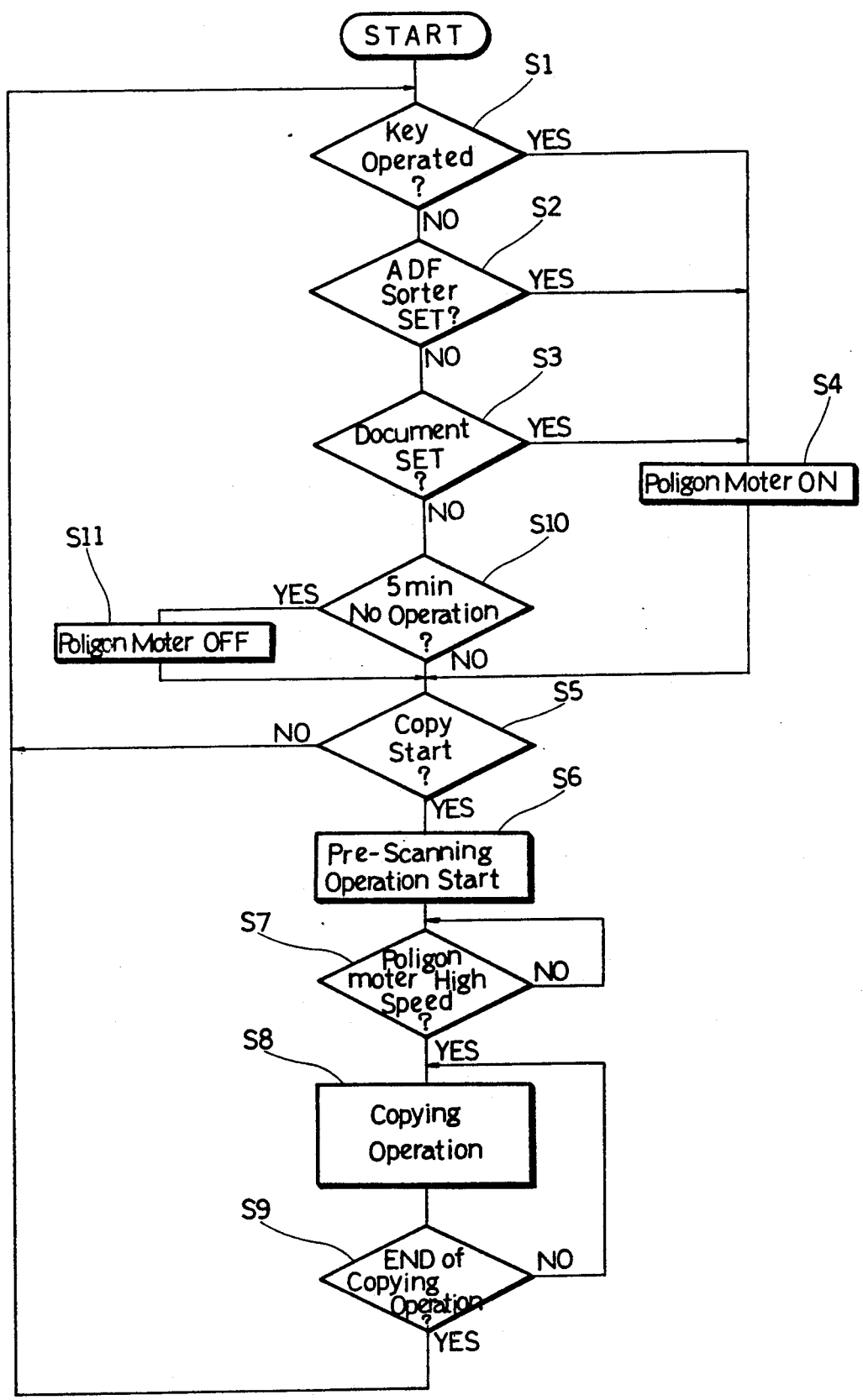
FIG. 3 is a flow chart of the operating procedures of the above digital copying machine.

Subsequently, the operating procedure of the above digital copying machine is explained in accordance with FIG. 3. In FIG. 3, S1, S2, S3, ... show the step of respective operations.

Firstly, an operator turns on the power switch 5 (Refer to FIG. 1). At this time, the polygon motor still remains stopped.

Subsequently, when the number-of-copies setting switch on the operation panel 6 is operated (S1), a document is set on the document set portion 2a of the automatic document feeding unit 2 is set (S2), or it is detected by opening and closing of the document pusher mat that a document is set on the document set plate (S3), the above polygon motor begins to rotate (S4).

In this case, means for starting the rotation of the polygon motor is so composed that the above polygon motor 8 can begin to rotate when the above operating portions are operated in the steps of S1, S2, S3 and S4.

And when the copy starting switch on the operation panel 6 is operated (S5), pre-scanning operation is started in the above optical system unit 9 (S6). As a specified period of time elapses while the pre-scanning operation of the optical system unit is being carried out in the step S6 and conducting the operation of other operating portions by an operator, the polygon motor 8 reaches its high speed stabilized state.

In the step S7, in the case that it is judged that the polygon motor 8 has reached the high speed stabilized state, the sorter 1, the automatic document feeding unit 2, and the printer unit 10 are driven by control signals coming from the control board 11, thereby causing copying operation to be conducted (S8).

The copying operation in the above step S8 is continued until it is judged that the copying operation of the number of times corresponding to the number of copies preset in the step S9 has been terminated.

As shown in the above description, the processing time necessary in the steps S1, S2, S3 and S6 can be effectively utilized as stand-by time of the polygon motor 8.

When it is judged that no operation is made for the operating portions by an operator for a specified period of time (S10) (for example, 5 to 15 minutes) after it is judged that the copying operation in the step S9 has been terminated, the polygon motor 8 stops rotating (S11).

In this case, means for stopping the rotation of the polygon motor 8 is so composed that the stopping means can stop the rotation of the polygon motor 8 when the specified period of time has elapsed after the copying operation has been terminated in the above steps S10 and S11.

And the digital copying machine waits for the following operations by an operator with the polygon motor 8 stopped.

Therefore, in the digital copying machine of this preferred embodiment, it is possible for the polygon motor not to be caused to rotate at all times, taking quick response for the copying operation by an operator into consideration.

As a result, rotary noise of the polygon motor which may give a sense of uncomfortable feeling to persons in the vicinity can be eliminated at all times, and simultaneously contact type bearings whose service life is not long but which are cheap in the cost of production thereof can be adopted as bearings of the above polygon motor 8.

Also in this embodiment by installing a sheet-like contact detection switch at the operating portion, for instance, at the grip portion of the automatic document feeding unit 2, it is possible for the polygon motor to begin to rotate when an operator touches this contact detection switch.

In the preferred embodiment described in the above, it has been so composed that the drive motor can begin to rotate when an operator operates the operating portion. However, the image forming equipment may be so composed that the drive motor can begin to rotate when an operator approaches the image forming equipment. The example of this composition is shown with regard to FIG. 4 and FIG. 5.

Figure 4:
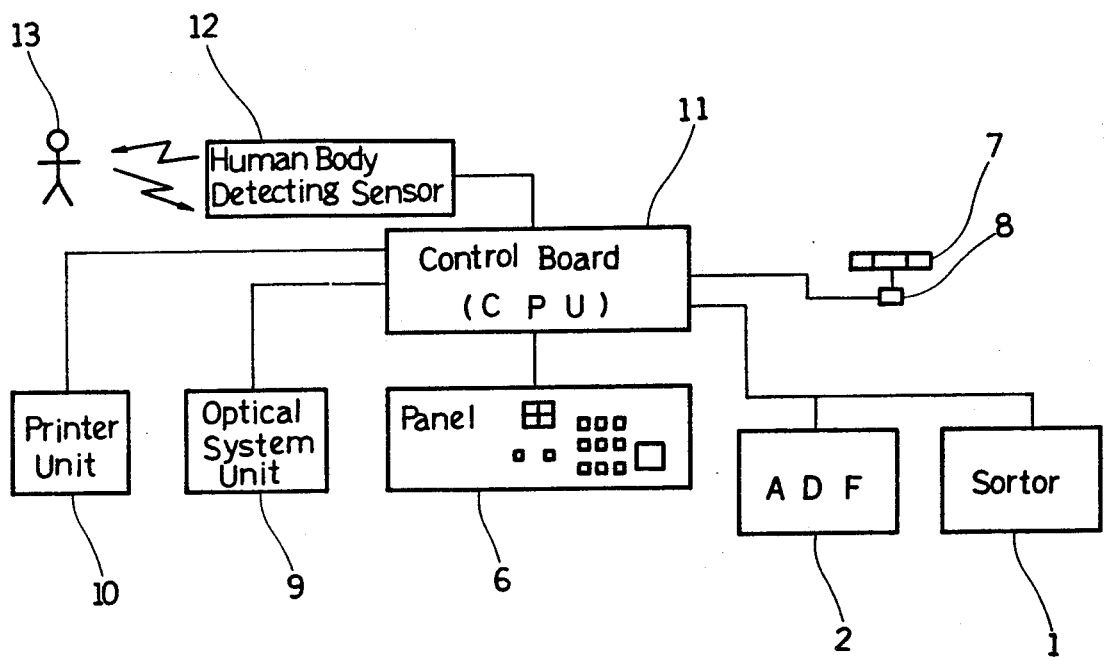
FIG. 4 is a block diagrammatic view of a control system of another digital copying machine.
Figure 5:
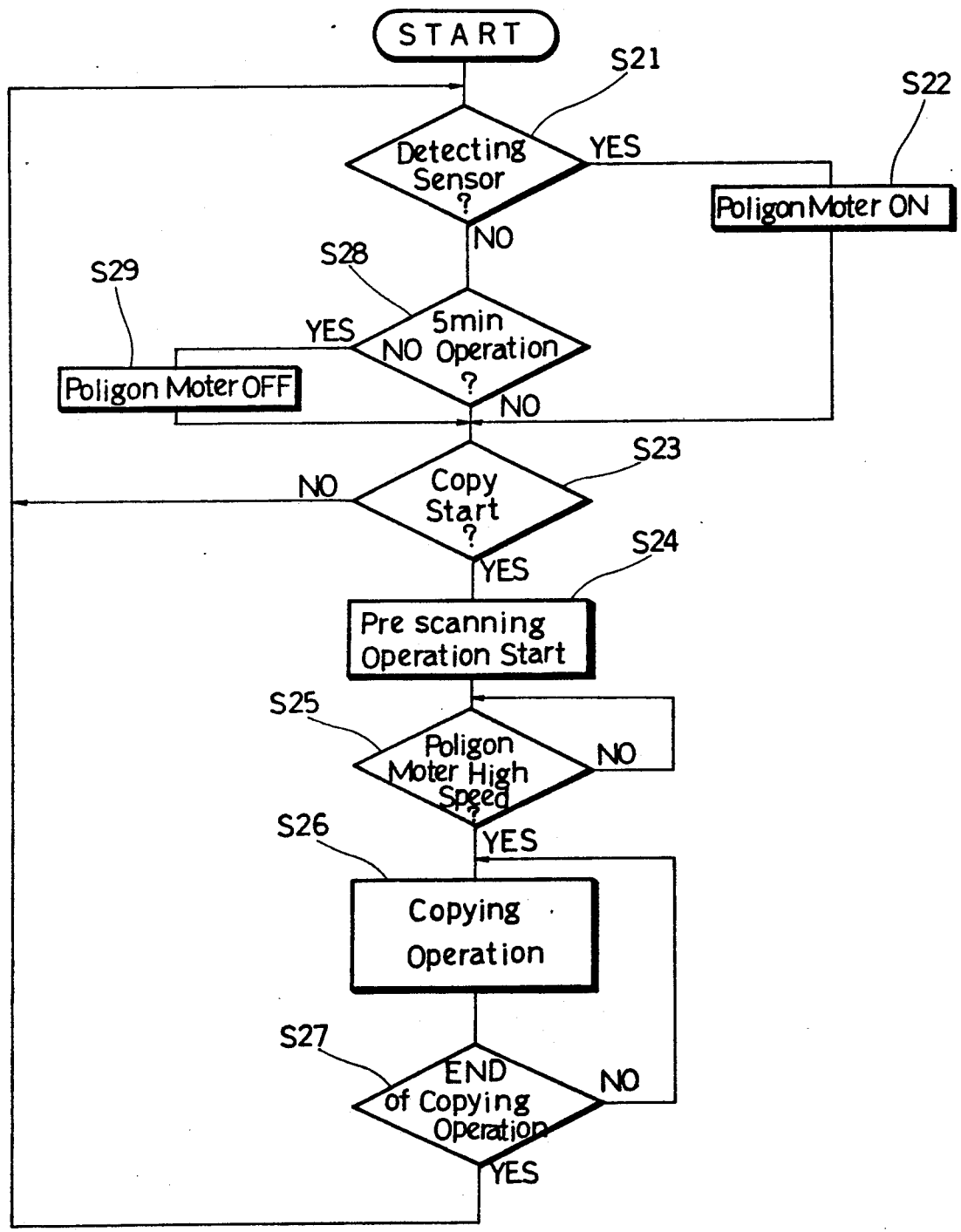
FIG. 5 is a flow chart of the operating procedures of the above digital copying machine shown in FIG. 4.

Here, FIG. 4 is a block diagrammatic view of the above digital copying machine. FIG. 5 is a flow chart showing the operating procedure of the digital copying machine.

The digital copying machine of this example is of almost the same in appearance as that of the conventional digital copying machine.

A point to be noted herein is that a human body detecting sensor 12 (detecting means) is provided at the front side of the above copying machine proper 3 in the digital copying machine of this example.

The above human body detecting sensor 12 can detect existence of an operator 13 (Refer to FIG. 4) who approaches the copying machine proper 3. For example, an ultrasonic wave sensor or an infrared ray sensor may be used as a detecting sensor.

The other components, for example, a polygon mirror 7, a polygon motor 8, an optical system unit 9, a printer unit 10, etc. are so arranged in the same manner as the above preferred embodiment.

Subsequently, the operating procedure of the above digital copying machine is explained with regard to FIG. 5.

When any operator 13 does not approach the copying machine with the power switch 5 turned on (refer to FIG. 1), the polygon motor 8 still remains stopped.

And when existence of an operator 13 who has approached to the copying machine to make copying operations is detected by the above human body detecting sensor 12 (S21), the above polygon motor 8 begins to rotate (S22).

In this case, means for starting the rotation of the polygon motor 8 is so composed that the means can start the rotation of the polygon motor 8 on the basis of changes of the state of output signal from the human body detecting sensor 12 in the steps S1 and S2.

Thereafter, when the copying starting switch on the operation panel 6 is operated (S23), pre-scanning operation of the above optical system unit 9 is started (S24). The polygon motor 8 reaches the high speed stabilized state as a specified period of time elapses until the operator 13 approaches the copying machine 3 and begins operating and while the pre-scanning operation of the optical system unit 9 is being conducted in the step S24 and the operator 13 is operating the other operating switches.

In the case that it is judged that the above polygon motor 8 has reached the high speed stabilized state in the step S25, for instance, the sorter 1, the automatic document feeding unit 2, the printer unit 10, etc. are driven by control signals which come from the control board 11, thereby causing the copying operation to be carried out (S26).

The copying operation in the above step S26 is continued until it is judged that the copying operation of the number of times corresponding to the number of copies preset in the step S27 has been terminated.

As shown in the above description, the time until an operator starts the operation after approaching the copying machine 3 and the processing time necessary in the steps S23 and S24 can be effectively utilized as stand-by time of the polygon motor 8.

When it is judged that the operator 13 leaves from the copying machine 3 and no copying operation is made for a specified period of time (for example, 5 to 15 minutes) after it is judged that the copying operation in the step S27 has been terminated, the polygon motor 8 stops rotating (S29).

In this case, means for stopping the rotation of the polygon motor 8 is so composed that the stopping means can stop the rotation of the polygon motor 8 when the specified period of time has elapsed after the copying operation has been terminated in the above steps S28 and S29.

And the digital copying machine waits for the following operations by an operator with the polygon motor 8 stopped.

Therefore, in the digital copying machine of this preferred embodiment, it is possible for the polygon motor not to be caused to rotate at all times, taking quick response for the copying operation by an operator into consideration.

As a result, rotary noise of the polygon motor which may give a sense of uncomfortable feeling to persons in the vicinity can not be generated at all times, and simultaneously contact type bearings whose service life is not long but which are cheap in the cost of production thereof can be adopted as bearings of the above polygon motor 8.

Also a human body detecting sensor 12 of this embodiment may be installed at a side of the copying machine proper 3 or a plurality of the detecting sensors 12 may be provided. Furthermore, the above human body detecting sensor 12 can be provided apart from the copying machine proper 3.

It will be apparent that many other modifications and variations could be effected by one skilled in the art without departing from the spirit and scope of the novel concept of the invention. Therefore, though the above embodiments are a preferred example, the invention is not limited to the above embodiments.

It can be understood that any modifications and variations which can be produced within the inventive scopes shown in the claims described hereinafter and the scope meant by the claims hereof are all included in the claims attached hereto.

What is claimed is:

1. A digital image forming equipment in which an image is formed by reflecting and scanning laser light emitted from a source of light onto a photo-sensitive body by means of a polygon mirror driven and rotated by a drive motor comprising:

means for starting the rotation of a drive motor only when a power source of said image forming equipment is ON and a pre-operation which is operated before an image forming operation of the image forming equipment is performed, and means for stopping the rotation of the drive motor in a specified period of time after the termination of the image forming operation.

2. A digital image forming equipment in which image is formed by reflecting and scanning laser light emitted from a source of light onto a photo-sensitive body by means of a polygon mirror driven and rotated by a drive motor comprising;

means for detecting the existence of an operator who comes near to the above image forming equipment, means for starting the rotation of the above drive motor according to the state of output signals from the above detecting means, and means for stopping the rotation of the drive motor in a specified period of time after the termination of image forming operation.

* * * * *